United States Patent Office 2,794,525
Patented June 4, 1957

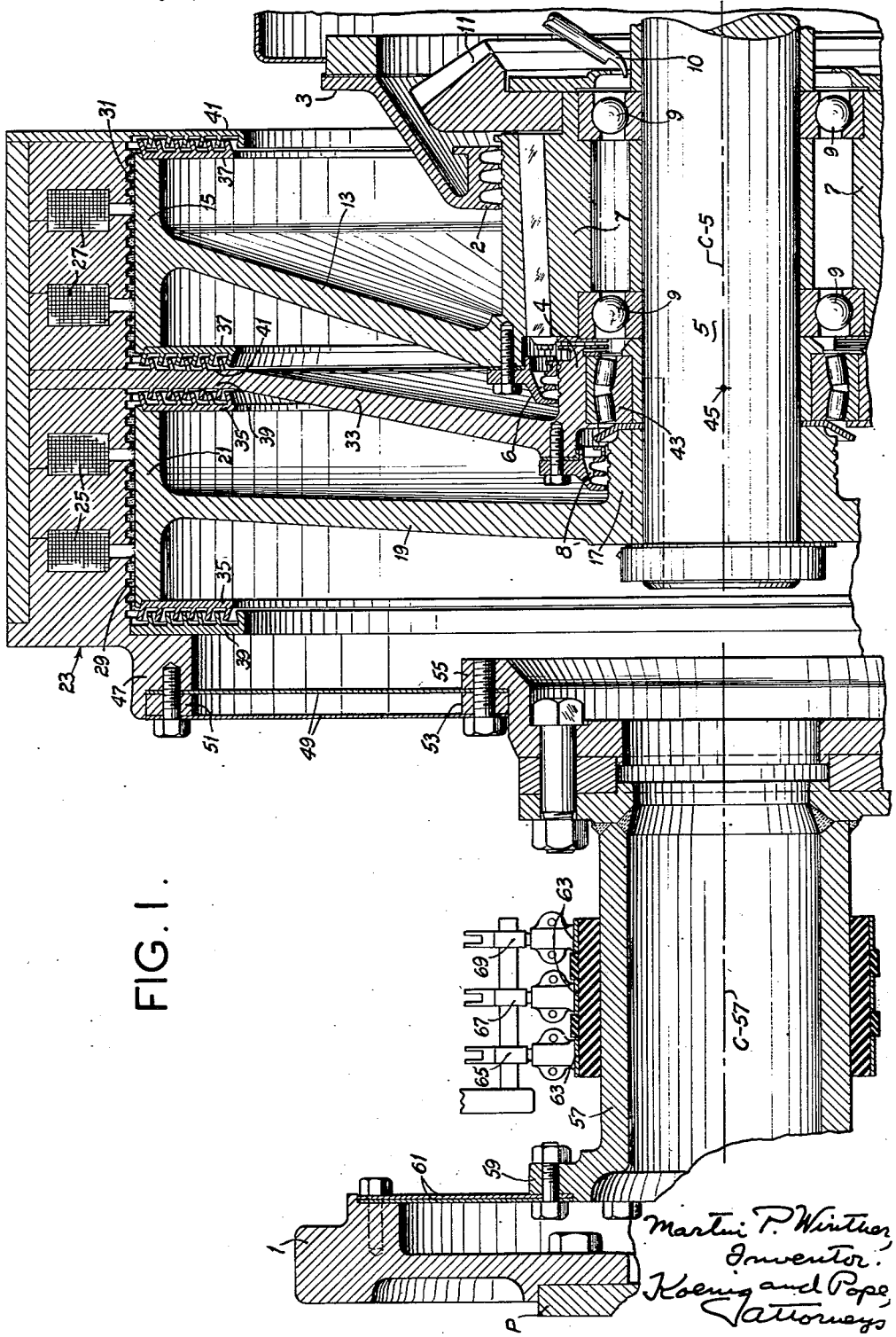

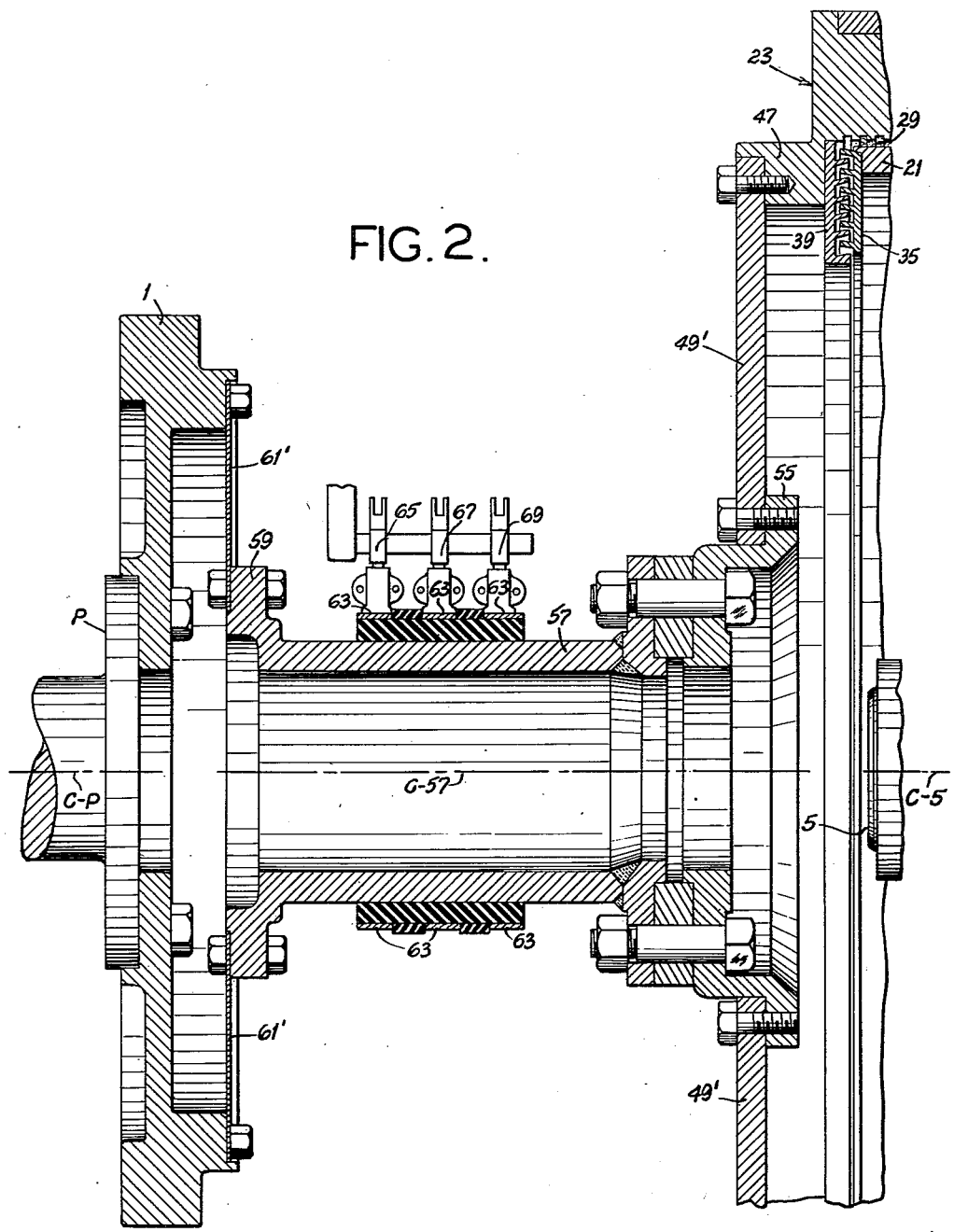

2,794,525

REVERSING ELECTROMAGNETIC DRIVE

Martin P. Winther, Gates Mills, Ohio, assignor to Eaton Manufacturing Company, Cleveland, Ohio, a corporation of Ohio Application July 8, 1953, Serial No. 366,853

4 Claims. (Cl. 192—51)

This invention relates to compound reversing electromagnetic drives or slip couplings, and with regard to certain more specific features, to a double-clutch drive of that type.

Among the several objects of the invention may be noted the provision of a double-clutch reversing electromagnetic drive, wherein the double-clutch parts are of the magnetic-particle type and are mounted according to an improved arrangement between a prime mover and a reversing gear box; the provision of a drive of the class described which with small magnetic gaps will function without rubbing interference although employing only a single articulating bearing supporting the driving member of the double clutch; the provision of a drive of the class described wherein the articulating bearing (which provides compensation for slight misalignments) articulates without requiring any additional pilot bearing to prevent such excessive articulation as might cause rubbing interference; and the provision of a drive of the class described wherein the means for dispensing with said pilot bearing constitutes a convenient spacing and axial compensating means. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a half-axial section illustrating one form of the invention; and, Fig. 2 is a fragmentary view similar to parts of Fig. 1, illustrating an alternative embodiment.

Corresponding reference characters indicate corresponding parts throughout the several views of the drawings.

Referring now more particularly to Fig. 1, there is shown at numeral 1 the flywheel of a usual prime mover and at 3 a portion of the casing of a reversing gear box. A driving flange of the prime mover is indicated at P and its center line at C—P (not in the latter connection Fig. 2). The prime mover and gear box may, for example, be of the type employed in marine drives.

Extending from the box 3 (Fig. 1) is the stub end of a conventional forward-drive shaft 5, the center line of which is indicated at C–5. A quill 7 is carried on bearings 9 on the shaft 5 and extends from the gear box 3 through a labyrinth seal 2. The quill 7 carries a bevel gear 11. The gear 11 is the first gear of a conventional reverse-gear train (not shown) in the box 3. Thus if shaft 5 and quill 7 are selectively driven in the same direction, a common member such as a propeller (conventionally connected both with the shaft 5 and to the gear 11 through the reversing train) may be selectively driven in forward and reverse.

The quill 7 constitutes the hub of a supporting member 13 for a cylindric magnetic (iron, for example) drum 15. Beyond the location of the quill 7 on shaft 5 is attached the hub 17 of another supporting member 19 for a second cylindric magnetic drum 21. Thus the bearings 9 produce an accurately aligned assembly of the drums 15 and 21.

Around the drums 15 and 21 a substantially cylindric magnetic field member 23 is located on a supporting member or hub 33. The field member 23 carries within it annular field coils 25 and 27. Coils 25, when electrically excited, form a toroidal flux field interlinking members 23 and 21 across a gap 29, and coils 27 likewise do so in connection with members 23 and 15 across a gap 31. The pairs of coils 25 and 27 are adapted respectively to be selectively energized. Within the gaps 29 and 31 are carried separate masses of finely divided or powdered magnetic material, such as described, for example, in the U. S. Patent 2,519,449 of H. J. Findley, dated August 22, 1950. Hence, when either pair of coils 25 or 27 is excited, a magnetic field interlinks member 29 with drum 21, or with drum 15, as the case may be, passing through the magnetic particles in the appropriate gap 29 or 31 to produce a driving connection between the field member 23 and either the field member 21 or field member 15. When the coils are deexcited and the magnetic fields disappear there is no driving connection. In order to prevent undue agitation of the magnetic particles under deexcited conditions, the volumes of the masses in gaps 29 and 31, respectively, are made somewhat less than the gap spaces which they occupy under such conditions.

The support 33 divides the gap 29 from the gap 31. In order to confine the magnetic particles within the respective magnetic gaps 29 and 31, pairs of labyrinth seals 35 and 37 are provided on the drums 21 and 15, respectively. The labyrinth seals 35 interdigitate with labyrinth seals 39; and labyrinth seals 37 interdigitate with labyrinth seals 41. The seals 39 and 41 will thus be seen to be rotary with the common driving field member 23, the seals 35 being rotary with the drum 21 and the seals 37 being rotary with the drum 15. Clearances across the gaps and between the adjacent seal parts are necessarily small.

The support 33 for driving member 23 is carried by an articulating bearing 43 of the antifriction type, located within the hub 4 of member 33. A labyrinth seal 6 is employed between quill 7 and the hub 4. A labyrinth seal 8 is employed between the hub 4 (of member 33) and the hub 17 (of member 19). Lubrication for the bearings 9 and 43 is provided through a nozzle 10 in a suitable oil circulating system. The bearing 43 (which compensates for slight misalignments to be mentioned) is located on shaft 5 between members 13 and 19. This minimizes resulting changes in clearance at gaps 29 and 31 and in the seals 35, 39 and 37, 41. It will be noted, however, that the potential articulation provided by bearing 43 is much greater than that needed for mere compensation for the stated minor misalignments, and this might result in rubbing interference between parts 15, 21 and 23 (including their labyrinth seals). In this connection, note that the outer race of bearing 43 (carried in 4) may articulate freely around virtual center 45.

One feature of the invention is to prevent excessive articulation around center 45, without the necessity for providing an extra pilot bearing between member 23 and the end of the shaft 5. This is accomplished by bolting a pair of spaced steel annular discs or plates 49 to a flange 47 on member 23. An outside spacer ring 51 and an inside spacer ring 53 are provided for spacing purposes. Centrally, the plates 49 and ring 53 are bolted to a flange 55, which in turn is bolted to a driving spool or quill 57. The center line of the spool is shown at C–57. It is for slight misalignments only between C–57 and C–5 that the desired limited articulation of bearing 43 is intended. A flange 59 at the other end of the spool is bolted to the inside of a pair of adjacently located steel plates or discs 61. The latter are peripherally bolted to the flywheel 1. Insulated collector rings 63 are mounted around the spool 57 and are placed by means of brushes 65, 67 and 69 in a suitable exciting circuit with the coils 25 and 27. Brushes 65 and 69 are respectively connected to the outside ones of the coils 25 and 27. The inside ones of these coils 25 and 27 are connected to a common return through brush 67. The coils of pair 25 are in series and so are the coils of pair 27. A suitable switching means is provided in the circuit for selectively applying voltage either from brush 65 through coils 25 to the return through brush 67, or from brush 69 through coils 27 to the return through brush 67.

For a machine of the order of 4 feet in diameter at the gaps 29 and 31, the annular plates 49 may be of the order of 3/16 inch thick, having a 3/4 inch spacing between them. Then plates 61 may also be 3/16 inch thick with no spacing between them.

Operation is as follows:

Rotation of the prime mover rotates flywheel 1, spool 57, plates 49 and field member 23. Excitation of coils 25 will result in driving the inductor drum 21 and the forward-drive shaft 5. At this time the coils 27 are deexcited. Reverse drive is accomplished by deexciting coils 25 and exciting coils 27. This couples field member 23 with the inductor drum 15, which drives the gear 11 and the reverse gearing connected thereto. By deexciting both coils, all magnetic driving connections are broken.

The articulating bearing 43 provides the compensation required for any slight misalignment between the rotary systems connected with shaft 5 and quill 7 on one hand, and the rotary system constituted by the spool 57 and field member 23 on the other hand. The compensation involved is not sufficient to cause rubbing at the gaps 29 and 31. The articulation in bearing 43 is, however, limited (without providing a pilot bearing on the end of shaft 5) by the fact that the distant flange 59 is supported from the flywheel 1 by the plates or discs 61. The spacing between plates 49 prevents excessive articulation between the center line of spool 57 and the center line of the field member 23, but allows telescopic axial movement between these. Consequently, there will be no excessive articulation (due to bearing 43) between the field member 23 and the drums 21 and 15. Nevertheless, the spool 57 may adjust axially relative to the field member 23 because of the substantially exclusively axial flexibility of the plates 49. As a result, slight differences in axial spacing between the position of field member 23 (fixed axially on shaft 5 by bearing 43) and spool 57 (substantially axially fixed on flywheel 1) may be compensated for by the spaced plates 49. This is a superior construction to one in which a pilot bearing is used between the spool 57 and the end of shaft 5 because, while allowing slight compensating articulation of bearing 43 (if called for), it does not allow unlimited articulation at this point. Refined axial placement of parts is not required, as would be the case if a pilot bearing were used. This is due to the non-articulating axial compensation afforded by the spaced plates 49 in the absence of such pilot bearing. It will be noted that the plates 61 do not provide substantial axial compensation (as do the plates 49) for the reason, first, that the plates are smaller in diameter, and, second, that they are not spaced.

In Fig. 2 is shown a modification in which corresponding reference characters indicate corresponding parts. In this case a solid disc 49' takes the place of the spaced plates 49 of Fig. 1. This likewise prevents substantial angular articulation between the center lines. However, it does not provide for axial compensation between parts 57 and 23. In this case a single axially compensating disc 61' is employed between the flange 59 and the flywheel 1. This plate 61' is sufficient to hold up the left end of the spool 57 against excessive articulation at bearing 43, while at the same time allowing for axial compensation.

Another feature of the invention exists in the fact that in many existing marine installations there is a certain spacing between the flywheel 1 of the prime mover and the reversing gear box 3. This spacing is taken up by the spool 57. And with the coils 25 and 27 employed on the outside field member 23, the collector rings may be positioned on this spool. It will be understood, however, that it is not absolutely necessary that the coils be carried on the outside rotary member, for this member may be made the inductor drum and the coils placed on the members 19 and 13, respectively. This alternative is not shown, since it constitutes a mere electrical inversion.

The location of the articulating bearing 43 on the stub end of the shaft 5 beyond the quill 7 and between the ends of the driven clutch members 21 and 15 minimizes the movements of the inner face of member 23 with respect to the outer faces of the drums 21 and 15, that is, for a given amount of compensation required to be made by the bearing 43 due to any angular misalignment between center lines C–5 and C–57. This is because only a small component of the resulting movements at the gaps 29 and 31 is across the gaps, most of this movement being axial relative to the gaps. Thus the danger of rubbing at the gaps 29 and 31 is minimized by the stated location of bearing 43.

Articulation at bearing 43 is further minimized when either pair of coils 25 or 27 receives an exciting pulse, because under such conditions the magnetic particles in the gap 29 or 31, as the case may be, form magnetized skeins which act as centering means. However, when both sets of coils 25 and 27 are demagnetized, these skeins disappear and it is under such conditions that the resistance against gross articulation provided by the plates 49 (Fig. 1) or the disc 49' (Fig. 2), taken in connection with the spool 57 and its mounting at the flywheel 1, provide the axially compensating alignment above discussed. It will be understood that the stippling in the drawings is diagrammatically indicative of the magnetic particles used in the gaps 29 and 31. It is preferable that the amount of magnetic material in a given gap be insufficient to fill the gap when the clutch is deexcited, but sufficient that when the clutch is excited, the particles are drawn into the gap to form a connection across a substantial area of it.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A drive adapted for connecting a prime mover and a reversing gear box having the possibility of slight misalignment between their center lines, the gear box having first and second drive means; comprising electromagnetic couplings constituted by a common driving member and an assembly of relatively rotary individual driven members separated from the common driving member by small running gaps, said driven members being attached respectively to said first and second means, a support for said common driving member including a bearing capable of angular articulation but substantially no axial movement and located on said assembly and also located axially between the ends of said driven members, a connecting means between the prime mover and said common driving member, a first connection between said connecting means and the prime mover providing only for slight articulation which may occur due to misalignment; a second driving connection between the connecting means and said common driving member, at least one of said first and second connections being adapted to provide for axial compensation for the position of the connecting means relative to the common driving member as determined by the position of said bearing.

2. A drive adapted for connecting a prime mover and a reversing gear box having the possibility of slight misalignment between their center lines, the gear box having first and second drive means; comprising electromagnetic couplings constituted by a common driving member and an assembly of relatively rotary individual driven members separated from the common driving member by small running gaps, said driven members being attached respectively to said first and second means, a support for said common driving member including a bearing capable of angular articulation but substantially no axial movement and located on said assembly and also located axially between the ends of said driven members, a connecting means between the prime mover and said common driving member, a first connection between said connecting means and the prime mover providing only for slight articulation which may occur due to misalignment, a second driving connection between the connecting means and said common driving member, also providing only for slight articulation which may occur due to misalignment, at least one of said first and second connections being adapted to provide for axial compensation for the position of the connecting means relative to the common driving member as determined by the position of said bearing.

3. A drive made according to claim 1, including exciter coils for the couplings and carried on said common driving member, wherein said connecting means is constituted by a spool, and including collector rings on the spool adapted to supply excitation to said coils.

4. A compound electromagnetic slip coupling comprising a common driving member of cylindric form, an assembly of cylindric relatively rotary coaxial driven members axially spaced from one another, said driven members being separated from the common driving member by small running gaps, the assembly of said driven members being constituted by a nonarticulating bearing between said driven members, a support for said common driving member including an articulating bearing capable of angular articulation but substantially no coaxial movement and located on said assembly in a position between the ends of said driven members, said support also including a radial member extending from said articulating bearing to a connection with said common driving member which is located between said axially spaced driven members, and flexible means supporting said common driving member for rotation from a prime mover, said last-named means permitting some articulation at said articulating bearing and providing for axial compensation for distance variations between the common driving member and the prime mover.

References Cited in the file of this patent

UNITED STATES PATENTS

| | | |
|---|---|---|
| 2,097,922 | Hodgson | Nov. 2, 1937 |
| 2,304,030 | Schmitter | Dec. 1, 1942 |
| 2,549,896 | Dunham | Apr. 24, 1951 |
| 2,629,552 | Dickey | Feb. 24, 1953 |

FOREIGN PATENTS

| | | |
|---|---|---|
| 256,303 | Switzerland | Feb. 16, 1949 |